United States Patent [19]

Moe et al.

[11] 4,124,222
[45] Nov. 7, 1978

[54] TREADLE SCOOTER

[75] Inventors: Walter Moe, Los Angeles; John A. Wessels, Santa Monica, both of Calif.

[73] Assignee: Diker-Moe Associates, Los Angeles, Calif.

[21] Appl. No.: 834,676

[22] Filed: Sep. 19, 1977

[51] Int. Cl.² .................................. B62M 1/04
[52] U.S. Cl. .................................. 280/221; 280/255
[58] Field of Search .............. 280/220, 221, 255, 253, 280/87.04 R, 254, 256, 257, 258

[56] References Cited

U.S. PATENT DOCUMENTS

| | | | |
|---|---|---|---|
| 2,723,131 | 11/1955 | McChesney | 280/221 |
| 3,006,659 | 10/1961 | Krasnoff et al. | 280/221 |
| 3,175,844 | 3/1965 | Whitehouse | 280/221 |
| 3,180,656 | 4/1965 | Gruenstein | 280/255 |
| 3,992,029 | 11/1976 | Washizawa et al. | 280/255 X |

FOREIGN PATENT DOCUMENTS 811,196  8/1951  Fed. Rep. of Germany ........... 280/254

Primary Examiner—Kenneth H. Betts
Attorney, Agent, or Firm—Ralph M. Braunstein

[57] ABSTRACT

A novel structure in a scooter type sport vehicle is presented. The vehicle is of the type which includes a supporting frame structure in combination with at least front and back wheels mounted for rotation with respect to said frame to define a wheeled vehicle. A rockable platform for supporting a standing rider is supported pivotably on said frame. The platform includes an extended forward portion so as to make the platform non-symmetrical with respect to the pivot, and the platform may be rocked back and forth on the frame about the pivot point with increased leverage exerted in the forward direction. Driving means responsive to the forward rocking movement of the platform is included for producing a unidirectional turning moment on the real wheel, whereby a rider may shift his weight to forwardly rock the platform and thereby propel the wheeled vehicle forward.

1 Claim, 3 Drawing Figures

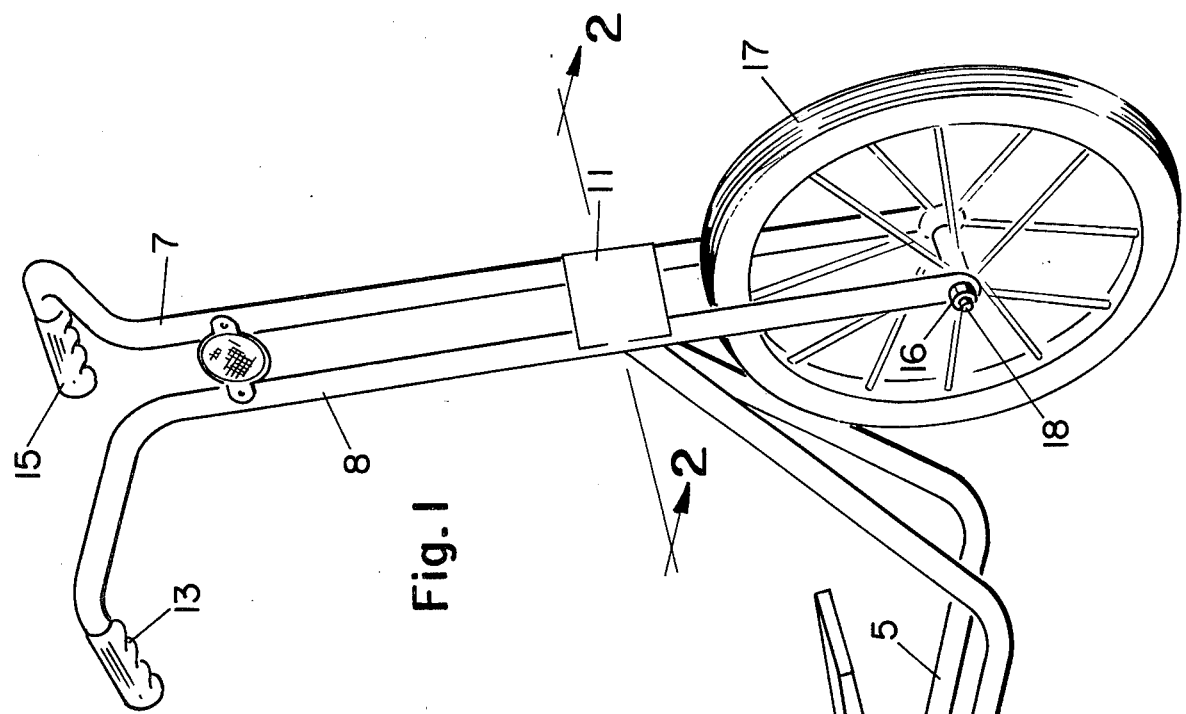
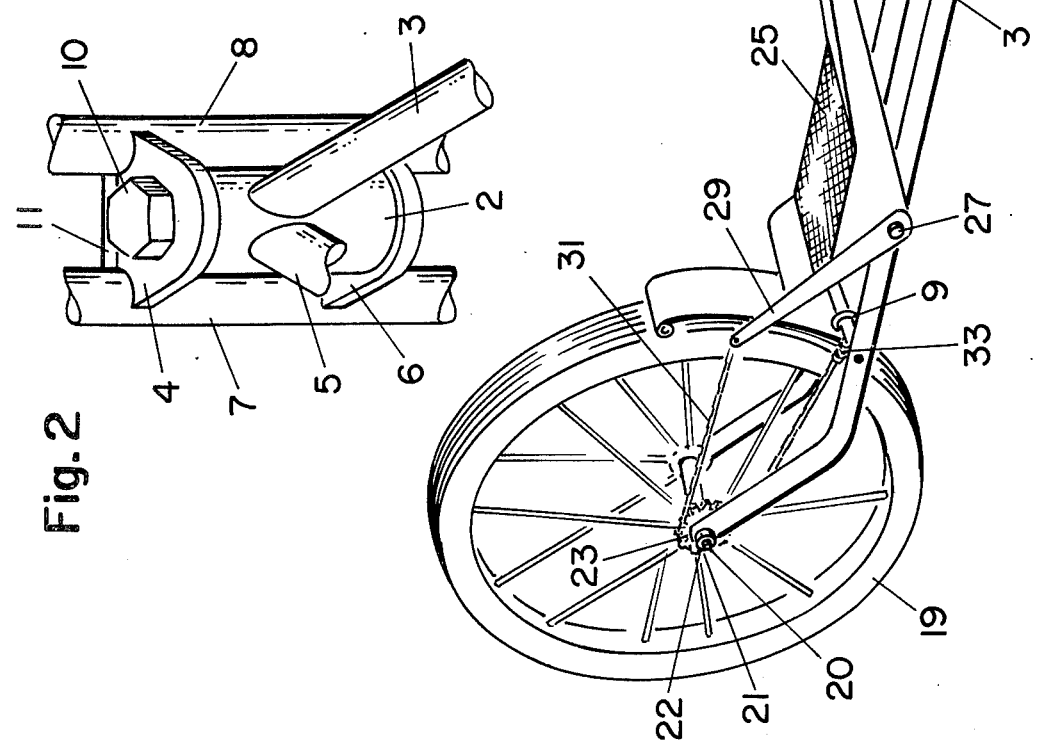

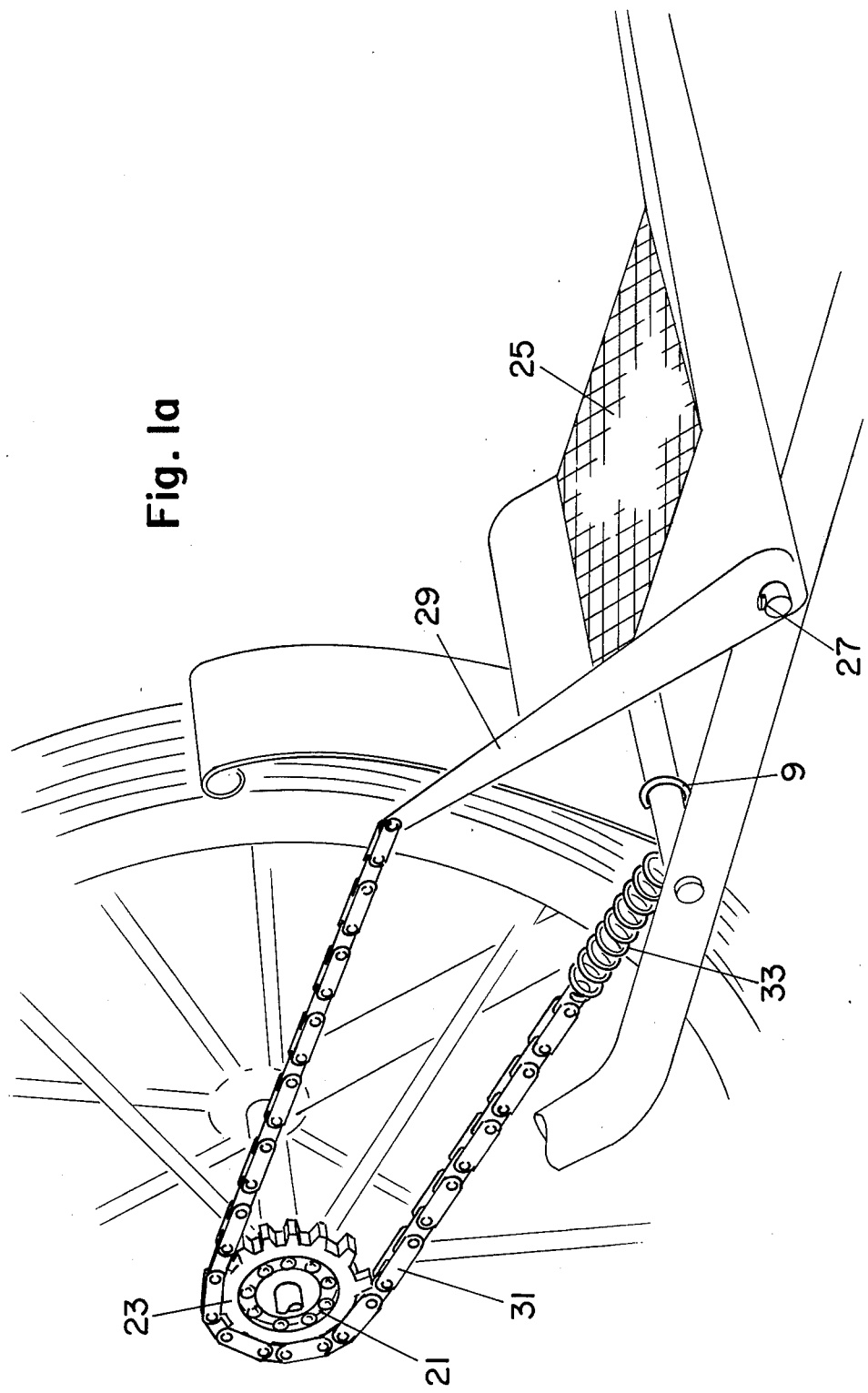

TREADLE SCOOTER

The present invention relates to children's sport vehicles, such as scooters and the like, having a frame and front and rear wheels for carrying a rider.

BACKGROUND OF THE INVENTION

Scooter type vehicles form a known class of wheeled vehicles used by children to play. These vehicles are capable of carrying a child generally in an upstanding position on a supporting frame. In its essentials this prior art apparatus contains an upstanding column, such as a steering column, containing handgrips; a base frame or platform; and front and rear wheels to carry the platform. The rider uses this structure generally by gripping the handles, resting one foot upon the platform and "scooting" the remaining foot along the ground to propel the vehicle forward. Once moving, the rider may place both feet on the platform and coast. An improvement to this basic scooter type vehicle is presented in U.S. Pat. No. 3,992,029, issued Nov. 16, 1976 to Washizawa, et al., to which the reader is directed. The scooter disclosed in the Washizawa patent allows the rider to create a forward propelling motion without the necessity of placing a foot upon the ground. Instead, the rider pushes rearwardly and downwardly upon a pivotable pedal. The pedal, in turn, is connected to a bracket supporting an idler roller which, in turn, pulls a chain over an engaged sprocket, which in turn is connected to a rear wheel by means of a free-wheeling clutch. In pulling the chain over the sprocket in a forward direction against the restraining force of a spring, a forward turning moment is created to turn the wheel and propel the vehicle. More specifically, an end of the chain is attached at one location on the frame, and the chain extends forwardly over a spring supported idler roller and thence rearwardly to a second idler roller, over the sprocket to a still additional idler roller, and the other end of a chain is affixed to a bracket which supports the rear wheel. Another bracket is joined between the wheel supporting bracket and a forward portion of the frame which in turn provides an additional function as acting as a stop or limit to the rearward movement of the pedal.

In combination with the foregoing, the Washizawa, et al. patent discloses a two-wheeled steering structure containing additional elements which allow the rider to steer the vehicle by shifting weight from one side to the other. As those who make reference to the cited patent specification and drawings can appreciate, the Washizawa vehicle although commendable and undoubtedly effective for its purpose, is of great complexity and employs a large number of elements which, in turn, results in a scooter that is relatively expensive to manufacture and maintain. Inasmuch as these types of sports vehicles are generally purchased for children of tender years for use over a very limited portion of the child's lifetime, as it is soon outgrown, the reader can appreciate the reluctance of a parent to purchase an expensive scooter, perhaps tantamount in price to a two-wheeled bicycle which the child might be expected to desire in the near future.

Accordingly, an advantage of the present invention is that it provides a foot operated scooter type vehicle which contains a minimal number of component elements for providing a foot operated scooter vehicle at a reasonable price and which is easy to assemble and maintain. In addition, it provides a foot treadle or rocking platform to which the operator may more readily apply driving force, utilizing the weight of his body to accelerate and propel the vehicle to higher velocities, in a manner not possible with the rearward pedal movement of the prior device to which reference is made above.

SUMMARY OF THE INVENTION

According to the invention there is provided a vehicle frame having a front and rear end; an upstanding column coupled to said frame at said front end containing handgrip means; a front wheel and a rear wheel, both of which are rotatably mounted, for supporting the frame; and a rockable treadle or platform supported on said frame intermediate said wheels; means for pivotably mounting said platform so as to permit rocking thereof; said platform containing a forwardly extending section which extends a greater distance beyond the pivot point than the corresponding rear section; said platform being of a size to support a rider and adapted to rock between a rearward and a forward position responsive to the rider shifting weight forwardly or backwardly; and driving means coupled to the rockable platform responsive to forward movement of the platform for producing unidirectional turning moment on the rear wheel.

In accordance with more detailed aspects of the invention, the driving means includes a sprocket for coaxial rotation with said wheel; free-wheeling clutch means coupled between the sprocket and wheel for permitting said sprocket to drive the wheel only in a first rotational direction; an elongate chain of predetermined length; an upstanding arm extending upwardly and rearwardly from the rear end of the rockable platform; and spring means; said arm, chain and spring means being connected in mechanical series relationship between said platform and frame, and with said chain means engaging said sprocket for rotating said sprocket during movement of the chain.

The foregoing objects of the invention as well as the structure characteristic thereof and structure equivalent thereto is better understood by giving consideration to the detailed description of a preferred embodiment which follows, taken together with the figures of the drawings illustrative thereof.

BRIEF DESCRIPTION OF THE DRAWINGS

In the drawings:

FIG. 1 illustrates a perspective view of a preferred embodiment of the invention;

FIG. 1a is an enlarged detail view of a portion of FIG. 1; and

FIG. 2 illustrates the reverse side of a section 2—2 of the embodiment of FIG. 1.

DESCRIPTION OF THE PREFERRED EMBODIMENT

The embodiment presented in FIGS. 1 and 1a includes a frame suitably formed of two spaced tubular steel members 3 and 5. The tubular members extend generally hornizontally and parallel to one another over a portion of the frame length. At the front end each tubular member has a generally inwardly bent portion extending at an angle upwardly to a common apex at a head tube, not visible in the figures, associated with the upstanding steering column illustrated. At the rear end each tube has a short length which extends upwardly at an angle and proximate the upper end thereof contains holes for receiving a transverse wheel axle with the holes of the frame member being axially aligned. A steel bar 9 is attached to members 3 and 5 to hold the members rigidly in fixed relation. Other cross members or bars may be added if additional rigidity is desired.

The upstanding steering column, comprising part of the scooter frame, is formed of two tubular steel members 7 and 8 formed together by a steel brace 11, which suitably is welded in position. The upper end of each of the members is bent to a generally horizontally extending portion, each of which contains handgrips 13 and 15 to serve as a grip for the rider. At the lower ends the members contain holes axially aligned for receiving a transverse wheel axle. Although the axle holes in each of the members is formed as stated, other obvious expedients may be substituted, such as hole-containing brackets fitted over the ends of the members, as is known from some types of bicycle construction.

To illustrate the upstanding steering column, brief reference is made to FIG. 2 which shows the reverse side of the section 2—2 in FIG. 1 to disclose in greater detail the assembly of tubular elements 3 and 5 in a rigid frame structure. In this, a head tube 2 of cylindrical metal is attached along its outer periphery to the ends of frame members 3 and 5 suitably by a weld. Bearing members 4 and 6 are attached, suitably with a weld, to the upstanding tubes 7 and 8, so that the head tube 2 fits therebetween. A bolt 10 is fitted through a center opening and fastened with a nut or double nut, or equivalent fastener, on the opposite side. Thus, the vehicle is steered by pivoting the upstanding column about the axis of head tube 2. Other equivalent elements may be employed for the foregoing purpose in this combination.

Returning again to FIG. 1, a front wheel 17 is mounted rotatably to the steering column 7, 8 with its axle 18 inserted through the openings in members 7 and 8 and attached by nuts, such as 16. A rear wheel 19 is mounted rotatably to the rear end of frame members 3 and 5, with the wheel axle 20 inserted through suitable frame openings and attached by nuts, such as 22. A sprocket 21 is mounted coaxially with the axle of wheel 19 and a free-wheeling clutch 23 of conventional structure is coupled between sprocket 21 and the wheel hub. These sprockets and clutches are conventional in structure and may be of the type illustrated in U.S. Pat. No. 3,992,029, earlier cited. The free-wheeling clutch couples the torque from the sprocket to the wheel when the sprocket is turned clockwise in the figure and uncouples the reverse torque when the sprocket is torqued counterclockwise. This ensures unidirectional rotation of the wheel.

A treadle or platform 25 is situated overlying the horizontal intermediate portion of frame members 3 and 5 and is joined thereto by means of a transverse pivot pin 27 extending through axially aligned openings in the opposed frame members. Pivot pin 27 preferably is of high quality steel to support the weight of the rider and the stress of operation. The pivot 27 may be formed with thrust or ball bearings, if greater ease of operation is desired. The platform is formed preferably of tough steel in any conventional manner and may include a treadle-like or friction promoting upper surface.

The width of platform 25 is of an extent which spans the distance between frame members 3 and 5 and is of a length so as to extend over a substantial portion of the length of the horizontal portions of the frame members. This requires the rider to stand with both feet atop the platform, as is intended in the operation of the invention. Moreover, as is apparent from the figure, the pivot is located at a point closer to the rear end of the platform than the front end thereof with the portion of the platform's length to the right of the pivot, as viewed in this figure, at least twice as long as the remaining rear portion to the left of the pivot. The greater length of the front portion of the platform ensures a greater mechanical advantage or moment as the rider shifts his weight forward to depress the front portion and drive the rear wheel through the linkage provided.

An upstanding metal arm 29, attached to the platform suitably by a weld, extends from the location of the pivot 27 to reinforce the pivot, rearwardly and upwardly, to a position elevated from the upper surface of the rear portion of platform 25. The upper end of the arm includes a pin-receiving opening to receive a pin of an end link of an elongated flexible steel roller link chain 31 of conventional structure. The chain extends over and engages sprocket 21 and therearound angularly extends downwardly at an angle where it is connected to an end of an expansion spring 33. The other end of spring 33 is fastened to the end of rod 9 to firmly anchor the spring to the frame. As is apparent, the assembly of arm 29, chain 31 and spring 33 forms a mechanical series connection between the platform and the frame. Ideally, the force produced by spring 33 is sufficient to maintain chain 31 in a taut condition engaged with sprocket 21 and to force the unoccupied platform rocked to the rearward position.

The platform contains underlying surfaces which form an angle to one another about the pivot resembling somewhat in geometry from a side view an inverted triangle. This allows the platform to rock or be rocked about the pivot, clockwise in the figure, limited by the abutment of the front end thereof with the frame members, and correspondingly, rocked to the rear counterclockwise about pivot 27, limited similarly by the abutment of the rear surface with the frame members. Other equivalent expedients apparent to the reader may be substituted to limit the movement of the rocking platform as desired.

As assembled in the manner illustrated and described, a child may mount the scooter gripping handgrips 13 and 15 and placing first one foot and then the other on the rocking platform while so doing pushing the scooter forward to propel the vehicle and allow it to coast. Initially, it is assumed that the rider balances the platform. By stepping forward on the front end of platform 25 and shifting his weight forward, the platform is rocked clockwise about pivot 27, rotating the end of arm 29 upwardly and forwardly. The arm in turn pulls chain 31 upward and forward against the restraining force of spring 33, which stretches in length, and rotates, clockwise, sprocket 21, with which the chain engages, over an arcuate distance. Rotation of sprocket 21 is coupled with free-wheeling clutch 23 to the hub of wheel 19 creating a torque or rotational moment, as variously termed, and the wheel rotates clockwise propelling the vehicle forward. The rider then shifts his feet or weight to the rear of the platform to rock the platform counterclockwise, rotating arm 29 counterclockwise and releasing the pulling force on chain 31. The force exerted by spring 33 then predominates, pulling the chain back. In moving in the reverse direction, the chain drives the engaged sprocket counterclockwise. However, the clutch does not couple the motion in this direction to the hub of the rear wheel. Through a series of these rocking maneuvers the rider thus provides the mechanical force to rotate the rear wheel sufficiently to propel the vehicle over a distance and keep it rolling.

The greater length of the front upper portion of the platform located between the pivot and the front end of the platform in comparison to the lesser length of the remaining portion ensures that the rider can exert a sufficient mechanical leverage on the chain against the force of spring 33. Further, it allows the rider to adjust the position of his weight by placing it at the position along the front upper portion at a position in which the rider can obtain the degree of thrust that is found comfortable and, alternatively, to permit different riders of different weight to use the same vehicle.

As the foregoing description discloses, the invention provides an easy to operate scooter type sport vehicle containing a driving means to propel the vehicle forward, in which the driving means is constructed of a minimum number of component elements resulting in an inherently less expensive structure than the corresponding means of the prior art Washizawa et al vehicle. For example, the chain in the invention is much shorter than the chain in the Washizawa structure. Consequently, it is believed that the vehicle may be economically available to a larger number of people than a more complicated one and in that manner the vehicle of this invention possesses a greater usefulness or utility within the meaning of the patent laws. Moreover, our configuration allows the operator of the vehicle to move naturally to employ his body weight in a shifting mode to propel the device in a faster and more exciting manner. In the general sense, each of the component elements of the novel structure is an old kind of device, including frames, wheels, chain, spring, platform and the like, disclosed in this specification. However, it is believed that the detailed arrangement or combination of those elements, including the necessary modification thereto, into a functional relationship as a useful sport vehicle as taught and described in this specification, is neither disclosed in or suggested by the prior art, and the novel combination is thus a useful invention.

It is believed that the foregoing description of a preferred embodiment of the invention is presented in such detail sufficient to enable one skilled in the art to make and use the invention without undue experimentation. However, it is expressly understood that the details presented for the foregoing purpose are not to be construed as limiting the invention to those details inasmuch as other substitute equivalent elements as well as additions, modifications or improvements thereto, some of which were heretofore described in the specification, and all of which embody the invention, will suggest themselves to one skilled in the art upon reading this specification. It is respectfully requested therefore, that the invention be broadly construed within the full spirit and scope of the appended claims defining this invention.

What is claimed is:

1. The sport vehicle for carrying a rider in a generally standing position comprising: a frame member which includes:
   at least two bars, each having an intermediate section extending over a first distance generally horizontally,
   an angularly upwardly rearwardly extending rearward section, and
   an angular upwardly forwardly extending front section;
   the intermediate sections extending generally parallel to one another and spaced apart a predetermined distance;
   a head tube at the front end coupled to the end of the front section of each bar;
   a cross bar connected between the intermediate sections of the two bars;
   wheel axle receiving means at the rear end of the rear section of the bars;
   an upstanding steering column containing two spaced apart handgrip means and two spaced apart generally parallel portions containing wheel axle receiving means;
   means coupling the column to the head tube means for permitting pivotal movement of the column relative to the frame member;
   a rockable treadle member for supporting a rider on the frame member;
   the treadle member having a side surface geometry of an unsymmetrical inverted "V" shape with one arm extending a greater distance from the apex thereof than the other and a platform surface over the apex;
   pivot means coupled to the intermediate section of the bars of the frame member and to the treadle member for permitting the treadle member to be rocked forwardly and rearwardly, alternately, essentially about the apex;
   the treadle being of length and width dimensions to cover at least most of the length of the upper surface of the bars and at least the distance between the two bars;
   a front wheel mounted for rotation to the steering column;
   a rear wheel mounted for rotation to the rearward section of the two bars, the rear wheel defining an axis of rotation;
   sprocket means mounted coaxially with the rear wheel for rotation about the axis;
   free-wheeling clutch means coupled between the sprocket means and the rear wheel for coupling rotational movement of the sprocket to the wheel in one direction of rotation and decoupling in the reverse direction of rotation;
   a rearwardly extending arm attached to the treadle means for joint movement therewith, the arm extending at least up to the axis of rotation with the treadle in an unoccupied condition;
   elongate chain means;
   spring means; the spring means having one end coupled to the frame at a position underlying and forward of the axis of rotation and the other end connected to an end of the chain for maintaining the chain taut;
   the other end of the chain being coupled to an upper end of the arm; and
   the chain engaging the sprocket;
   wherein forward rocking of the treadle means draws the chain end attached to the arm upwardly and forwardly to turn the sprocket and wherein during backward rocking of the treadle means the spring means pulls the chain means in the reverse direction.

* * * * *